United States Patent Office 2,830,989
Patented Apr. 15, 1958

2,830,989
PROCESS FOR THE PRODUCTION OF YELLOW VAT DYESTUFFS OF THE ANTHRAQUINONE SERIES

Heinz-Werner Schwechten, Leverkusen-Bayerwerk, Germany, assignor to Farbenfabriken Bayer Aktiengesellschaft, Leverkusen, Germany, a corporation of Germany No Drawing. Application August 4, 1955
Serial No. 526,560
Claims priority, application Germany August 7, 1954
8 Claims. (Cl. 260—261)

This invention relates to a process for the production of yellow vat dyestuffs of the anthraquinone series.

It is known that reddish-yellow vat dyestuffs can be obtained by the acylation of 1-aroyl-amino-5-amino-anthraquinones with aliphatic or aromatic dicarboxylic acids, but these dyestuffs are not particularly fast to light.

It has also been disclosed in German specification No. 579,325 that a yellow vat dyestuff is obtained by acylation of 1-benzoyl-amino-5-amino-anthraquinone with quinoline-8-carboxylic acid, but this is a cold dye which has a weak color and a very low dyeing power. Moreover, the vat dyestuff obtained by acylation of 1-amino-anthraquinone with 2(N), 1-pyridino-anthraquinone-3-carboxylic acid, as disclosed in German specification No. 696,423 is extremely weak in color and has a very low dyeing power.

It is an object of the present invention to provide novel yellow vat dyestuffs. A further object is to provide novel vat dyestuffs which exhibit excellent dyeing power and excellent fastness properties. Other objects will appear hereinafter.

By the present invention valuable and very light-fast greenish-yellow vat dyestuffs are obtained if 1-acyl-amino-5-amino-anthraquinones the acyl radical of which is derived from a quinoline 8-carboxylic acid (preparation in accordance with the copending application Ser. No. 526,-559 filed August 4, 1955 are acylated with aliphatic or aromatic dicarboxylic acids or with yellow vattable carboxylic acids such as, for example, 1,9-thiazolanthrone-2-carboxylic acid, thiazolanthraquinone—carboxylic acid, imidazolo-anthraquinone—carboxylic acid, pyrazoloanthraquinone—carboxylic acid or 1,9-anthrapyrimidine-2-carboxylic acid.

By a quinoline-8-carboxylic acid is to be understood quinoline-8-carboxylic acid itself, its substitution products, and also acids such as 5,6-phthalyl-quinoline-8-carboxylic acid (2(N), 1-pyridine-anthraquinone-3-carboxylic acid).

Examples of aliphatic or aromatic dicarboxylic acids which can be used in the process of the present invention are oxalic acid, isophthalic acid and terephthalic acid. Thiazolanthrone carboxylic acid and anthrapyrimidine carboxylic acid are examples of heterocyclic yellow, vattable carboxylic acids containing nitrogen atoms which can be used for the acylation.

Those of the novel vat dyestuffs which are obtainable by the process of the present invention and which are obtained by acylation with heterocyclic nitrogen-containing carboxylic acids, such as, for example, thiazolanthrone carboxylic acid or anthrapyrimidine carboxylic acid, can also be prepared from 1-acylamino-5-aminoanthraquinones the acyl radical of which originates from thiazolanthrone carboxylic acid or anthrapyrimidine carboxylic acid, by acylation with the aforementioned quinoline-8-carboxylic acids.

In another embodiment of the invention some of the dyestuffs of this application are as well obtained by reaction of a 1-acylamino-5-amino-anthraquinone containing a simple acyl group such as the benzoyl group with the above heterocyclic yellow vattable carboxylic acid, splitting off in known manner the acyl radical of the 1-acylamino group while the amino group acylated with the heterocyclic yellow vattable carboxylic acid remains unchanged (see the copending application Serial No. 526,-559), acylating the 1-amino-5-acylamino-anthraquinone thus obtained with the quinoline-8-carboxylic acid as described above. The acylation can be carried out in accordance with known methods and proceeds without any difficulties. The novel vat dyestuffs of the anthraquinone series which are obtainable by the process of the invention are surprisingly characterized by a substantially better fastness to light than the hitherto known dyestuffs of this type which are referred to above. In addition they are warm or hot dyes with an intense color and very good dyeing powers, and they constitute a valuable addition to the technically utilizable vat dyestuffs owing to their very desirable greenish-yellow shade. The following examples further illustrate the invention without, in any way, limiting it.

*Example 1*

20 grams of 1-(quinoline-8'-carbonylamino)-5-aminoanthraquinone (prepared as described in Example 3 of the copending application Ser. No. 526,559) are heated in 400 cc. of dry nitrobenzene while stirring to 160° C. and 5 grams of terephthalic acid chloride are slowly added at the said temperature, the dyestuff precipitating as small yellow needles with evolution of hydrogen chloride. The substance is heated slowly to boiling point until the evolution of hydrogen chloride subsides, and the dyestuff is filtered off with suction at 90° C. and washed with warm nitrobenzene and with methanol.

The novel dyestuff is an excellent hot dye and dyes cotton from a dark grey vat in a greenish yellow color with very good fastness properties, and above all particularly good fastness to light.

A dyestuff having similar properties is obtained if isophthalic acid chloride is used instead of terephthalic acid chloride.

*Example 2*

17.5 grams of 1,9-anthrapyrimidine-2-carboxylic acid are suspended in 500 cc. of o-dichlorobenzene, 5 cc. of thionyl chloride are added, and the acid is converted into the acid chloride by heating while stirring. The solution is heated to 140° C., and 25 grams of 1-(quinoline - 8' - carbonylamino) - 5 - amino-anthraquinone are added, the dyestuff precipitating as brownish-yellow needles with evolution of hydrogen chloride. After the mixture has been heated to boiling point until the reaction subsides, the dyestuff is filtered off with suction at 90° C., and washed with warm o-dichlorobenzene and finally with methanol.

The novel dyestuff is a warm dye with good dyeing powers. It dyes cotton from a ruby-colored vat in very strong greenish-yellow shades having very good fastness to light.

*Example 3*

20 grams of 1-(5',6'-phthalyl quinoline-8'-carbonylamino)-5-aminoanthraquinone (prepared as described in Example 4 of the copending application Ser. No. 526,559) are heated to 160° C. with 600 cc. of dry nitrobenzene while stirring and 3.9 grams of terephthalic acid chloride are slowly added at this temperature. The mixture is then heated to boiling point until the evolution of hydrogen chloride is complete. The dyestuff initially precipitating in voluminous form then changes into fine yellow needles and is filtered off with suction at 150° C. and washed with warm nitrobenzene and with methanol.

The novel dyestuff is an excellent warm dye which dyes cotton from a claret-colored vat in clear yellow shades having very good fastness and above all very good fastness to light.

If isophthalic acid chloride is used instead of terephthalic acid chloride a dyestuff is obtained which has similar properties.

*Example 4*

20 grams of 1-(5′,6′-phthalyl quinoline-8′-carbonylamino)-5-amino-anthraquinone are heated with 600 cc. of nitrobenzene to 130° C. and 12 grams of 1,9-thiazolanthrone-2-carboxylic acid chloride are slowly added at this temperature. After the mixture has been heated to boiling point until the evolution of hydrogen chloride is complete, the dystuff precipitating as orange-yellow needles is filtered off with suction at 90° C. and washed with warm nitrobenzene and finally with methanol.

The novel dyestuff dyes cotton from a violet vat in strong and very light-fast clear yellow shades.

If 1,9-anthrapyrimidine-2-carboxylic acid chloride is used instead of thiazolanthrone-carboxylic acid chloride and if the procedure in other respects is as indicated in Example 4, a dyestuff is obtained which, when used as a warm dye, has very good dyeing powers and dyes cotton from a ruby-colored vat in strong very light-fast yellow shades.

I claim:

1. Dyestuffs corresponding to the formula

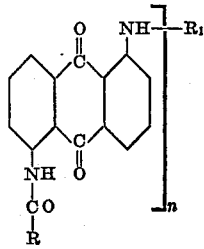

wherein R stands for a radical selected from the group consisting of 8-quinolinyl and phthalyl-8-quinolinyl, $n$ means one of the integers 1 and 2; when $n$ means the integer 1, $R_1$ stands for a radical selected from the group consisting of anthrapyrimidine carboxylic acid and thiazol anthrone carboxylic acid, and when $n$ means the integer 2, $R_1$ stands for a radical selected from the group consisting of lower aliphatic hydrocarbon dicarboxylic acid and aromatic carbocyclic hydrocarbon dicarboxylic acid.

2. As novel dyestuff

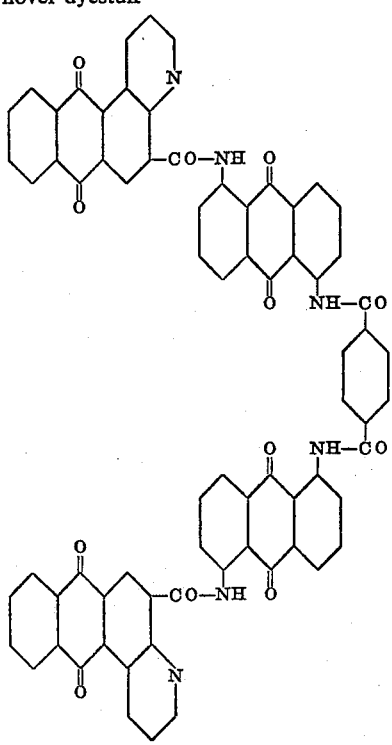

3. As novel dyestuff

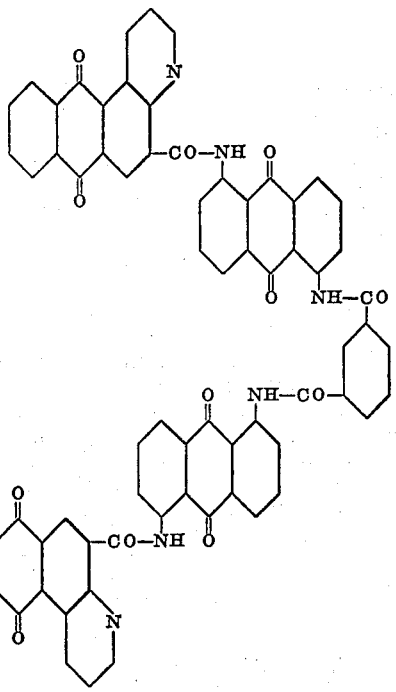

4. As novel dyestuff

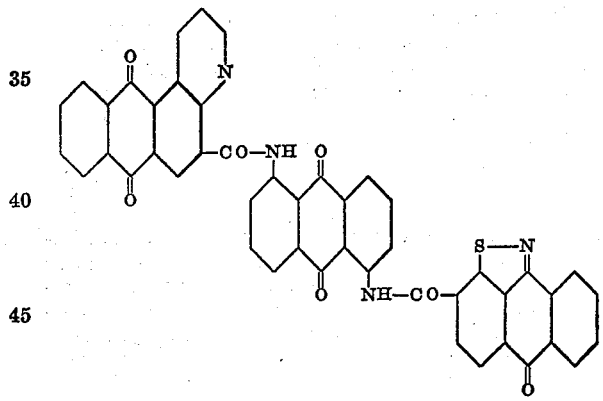

5. A process for the production of yellow vat dyestuffs of the anthraquinone series which comprises acylating at least an equivalent amount of a 1-acylamino-5-amino anthraquinone, the acyl radical of which is a member of the group consisting of anthraquinone pyrimidine carbonyl and thiazolanthrone carbonyl with a member selected from the group consisting of phthalyl-quinoline-8-carboxylic acid and quinoline-8-carboxylic acid at an elevated temperature to the boiling point of the reaction mixture and recovering the acylation product formed.

6. A process for the production of yellow vat dyestuffs of the anthraquinone series which comprises reacting at least an equivalent amount of a 1-acylamino-5-amino anthraquinone, the acyl radical of which is selected from the group consisting of phthalyl quinoline-8-carbonyl and quinoline-8-carbonyl with an acid chloride of a member selected from the group consisting of a lower aliphatic hydrocarbon dicarboxylic acid, a carbocyclic aromatic hydrocarbon dicarboxylic acid, anthrapyrimidine carboxylic acid and thiazolanthrone carboxylic acid at an elevated temperature to the boiling point of the reaction mixture and recovering the acylation product formed.

7. A process for the production of a yellow vat dyestuff which comprises acylating at least an equivalent amount of 1-(5′,6′-phthalyl quinoline-8′-carbonylamino)-5-amino anthraquinone with terephthalic acid at an elevated temperature to the boiling point of the reaction mixture and recovering the dyestuff formed.

8. A process for the production of yellow vat dyestuffs of the anthraquinone series which comprises reacting a 1-acylamino-5-amino-anthraquinone, the acyl radical of which is selected from the group consisting of phthalyl quinoline-8-carbonyl and quinoline-8-carbonyl with at least an equivalent amount of an acid chloride of a member selected from the group consisting of lower aliphatic hydrocarbon dicarboxylic acid, a carbocyclic aromatic hydrocarbon dicarboxylic acid, anthrapyrimidine carboxylic acid and thiazol anthrone carboxylic acid in the presence of an inert solvent at a temperature within the range of 130–205° C. and recovering the acylation product formed.

No references cited.